(12) United States Patent
Koyama et al.

(10) Patent No.: US 12,199,665 B2
(45) Date of Patent: Jan. 14, 2025

(54) OPTICAL MONITOR DEVICE

(71) Applicant: NIPPON TELEGRAPH AND TELEPHONE CORPORATION, Tokyo (JP)

(72) Inventors: Ryo Koyama, Musashino (JP); Masaaki Takaya, Musashino (JP); Yoshiteru Abe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 95 days.

(21) Appl. No.: 17/928,256

(22) PCT Filed: Jun. 2, 2020

(86) PCT No.: PCT/JP2020/021711
§ 371 (c)(1),
(2) Date: Nov. 28, 2022

(87) PCT Pub. No.: WO2021/245774
PCT Pub. Date: Dec. 9, 2021

(65) Prior Publication Data
US 2023/0318703 A1    Oct. 5, 2023

(51) Int. Cl.
*H04B 10/077* (2013.01)

(52) U.S. Cl.
CPC ... *H04B 10/0775* (2013.01); *H04B 2210/077* (2013.01)

(58) Field of Classification Search
CPC .......... H04B 10/0795; H04B 10/07955; H04J 14/05–052
See application file for complete search history.

(56) References Cited

U.S. PATENT DOCUMENTS 5,694,509 A    12/1997  Uemura et al.
10,374,708 B1 *  8/2019  Liao ................ H04B 10/25073
(Continued)

FOREIGN PATENT DOCUMENTS

JP        3450104 B2    9/2003
JP     2004219523 A    8/2004
(Continued)

*Primary Examiner* — Nathan M Cors

(57) ABSTRACT

For an optical monitor device that detects the intensity of light propagating through an optical fiber, a reduction in size and cost of the optical monitor device are to be achieved. The present disclosure provides an optical monitor device including: an optical component that branches an incoming light at a specific branching ratio and outputs the majority thereof in a specific direction and the rest thereof in another specific direction; a plurality of incoming-side optical fibers through which light is to propagate and that are two-dimensionally arranged to cause the light to enter the optical component; a plurality of outgoing-side optical fibers through which light is to propagate and that are arranged to receive the most outgoing light from the optical component; a light-receiving element located to receive a partial outgoing light from the optical component; an incoming-side lens located between the optical component and the incoming-side optical fibers and that causes the incoming light into the optical component to be a parallel light; and an outgoing-side lens located between the optical component and the outgoing-side optical fibers and that efficiently couples the outgoing light from the optical component to the outgoing-side optical fibers.

19 Claims, 5 Drawing Sheets

(56) References Cited

U.S. PATENT DOCUMENTS

| | | |
|---|---|---|
| 2002/0122619 A1 | 9/2002 | Sandler et al. |
| 2003/0231295 A1* | 12/2003 | Barrett .................. G01J 1/4257 |
| | | 356/73.1 |
| 2004/0147758 A1* | 7/2004 | Getman ............... C07D 235/30 |
| | | 548/217 |
| 2004/0202417 A1 | 10/2004 | Watanabe et al. |
| 2007/0146860 A1* | 6/2007 | Kikuchi .................. G02F 1/025 |
| | | 359/239 |

FOREIGN PATENT DOCUMENTS

| | | |
|---|---|---|
| JP | 2007536573 A | 12/2007 |
| JP | 201836637 A | 3/2018 |
| JP | 201866888 A | 4/2018 |

\* cited by examiner

OPTICAL MONITOR DEVICE

CROSS-REFERENCE TO RELATED APPLICATIONS

This application is a 371 U.S. National Phase of International Application No. PCT/JP2020/021711, filed on Jun. 2, 2020. The entire disclosure of the above application is incorporated herein by reference.

TECHNICAL FIELD

The present invention relates to an optical monitor device for monitoring light transmitted through an optical fiber.

BACKGROUND ART

A recent increase in internet traffic strongly requires a communication system to have an increased communication capacity. To achieve this, a communication system with an optical fiber is used for an access network between a communication station building and a user's home and a core network connecting communication station buildings to each other. For optical fiber communication, detection of the intensity of light propagating through an optical fiber is often performed in order to control the communication or check the soundness of equipment. For example, for an access network, a test light is caused to propagate through an optical fiber and the intensity of the light is detected, thereby checking the loss or soundness of the optical fiber, pair identification, or connection, or the like. In addition, WDM (Wavelength Division Multiplex) transmission, which is to be performed in a core network, necessitates monitoring of the intensity of light for the purpose of feedback control.

For light intensity monitoring for an access network, for example, a technology as described in Patent Literature 1 is used. Patent Literature 1 describes that light is to be branched at a constant branching ratio through two parallel waveguides. This technology enables measuring the intensity or propagation loss of an optical signal in the access network, or the like.

For the light intensity monitoring for WMD transmission, for example, a technology of Patent Literature 2 is used. Patent Literature 2 describes a technology where the intensities of optical signals through a plurality of optical fibers are simultaneously monitored by virtue of a combination of the one-dimensionally arranged optical fibers and a dielectric multilayer film.

CITATION LIST

Patent Literature

Patent Literature 1: Japanese Patent No. 3450104
Patent Literature 2: Japanese Patent Laid-Open No. 2004-219523

SUMMARY OF THE INVENTION

Technical Problem

However, an optical monitor device with a conventional arrangement or configuration is still disadvantageous as follows.

In the process of optical communication being widely used with the number of optical fiber cores of optical equipment/cable being increased, first of all, in a case where an optical monitor device includes an optical coupler for each optical fiber core, cost and size are increased in accordance with an increase in the number of cores. Even in a case where an optical monitor device includes optical fibers and light intensity sensors that are one-dimensionally arrayed, since there is a limit on the array arrangement of the optical fibers, cost and size would be increased in accordance with the number of cores if the number of cores of optical fibers is increased beyond the limit.

The present invention has been made in view of the above and an object thereof is to implement an optical monitor device for a multicore optical fiber including several tens of cores compactly and at low cost.

Means for Solving the Problem

An optical monitor device includes:
a branch surface configured to branch an incoming light entering through a predetermined incident region into two at a different branching ratio; and
a light-receiving element configured to receive, among branched lights branched by the branch surface, a branched light branched at smaller portion of the branching ratio and detect the intensity of the light branched by the branch surface for each incident position within the incident region.

Specifically, an optical monitor device of the present disclosure includes:
an optical component configured to branch an incoming light at a specific branching ratio and output a part of the incoming light in a first direction and the rest of the incoming light in a second direction;
a plurality of incoming-side optical fibers that are two-dimensionally arranged to cause light to enter the optical component;
a plurality of outgoing-side optical fibers that are two-dimensionally arranged to receive respective outgoing lights in the first direction from the optical component;
a light-receiving element located to receive outgoing lights in the second direction from the optical component;
an incoming-side lens located between the optical component and the incoming-side optical fibers and configured to cause incoming lights into the optical component to be parallel lights; and
an outgoing-side lens located between the optical component and the outgoing-side optical fibers and configured to efficiently couple the outgoing lights from the optical component to the outgoing-side optical fibers.

Effects of the Invention

According to the present disclosure, it is possible to implement an optical monitor device for a multicore optical fiber including several tens of cores compactly and at low cost.

DESCRIPTION OF EMBODIMENTS

Figure 1:
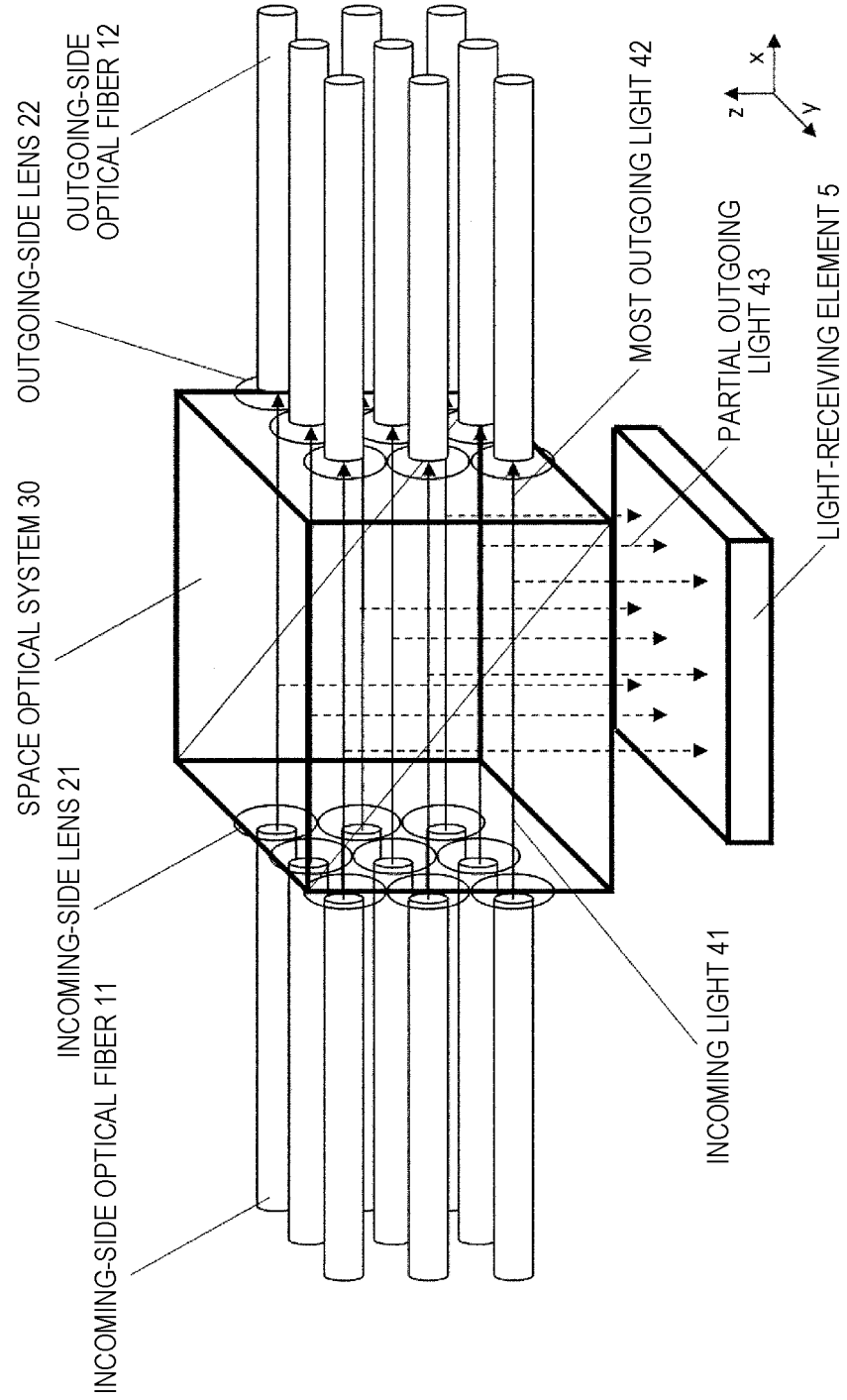
FIG. 1 illustrates a configuration example of an optical monitor device of the present disclosure.

A detailed description will be made below on embodiments of the present disclosure with reference to the drawings. It should be noted that the present disclosure is not limited to the embodiments described below. These examples of implementation are merely by way of example and the present disclosure may be implemented with a variety of modifications or improvements being added on the basis of knowledge of those skilled in the art. It should be noted that components that are referred to with the same sign herein or in the drawing are identical to each other.

To solve the above-described problem in the present invention, an optical monitor device that is to be implemented with a configuration illustrated by way of example in FIG. 1 is provided.

According to the present disclosure, an optical monitor device that detects the intensity of light propagating through an optical fiber includes:

a space optical system 30 that branches an incoming light at a desired branching ratio and outputs a part of the light in a first direction and the rest of the light in a second direction;

a plurality of incoming-side optical fibers 11 that are two-dimensionally arranged to cause light to enter the space optical system 30;

a plurality of outgoing-side optical fibers 12 that are two-dimensionally arranged to receive respective outgoing lights in the first direction from the space optical system 30;

a light-receiving element 5 located to receive respective outgoing lights in the second direction from the space optical system 30;

an incoming-side lens 21 located between the space optical system 30 and the incoming-side optical fibers 11 and that causes incoming lights into the space optical system 30 to be parallel lights; and an outgoing-side lens 22 located between the space optical system 30 and the outgoing-side optical fibers 12 and that couples the outgoing lights from the space optical system 30 to the respective outgoing-side optical fibers 12.

The optical monitor device of the present invention is an optical monitor device that detects the intensity of light propagating through an optical fiber, and includes:

a space optical system 30 that branches an incoming light 41 at a constant branching ratio and outputs the majority of the incoming light 41 in a specific direction and the rest of the incoming light 41 in another specific direction;

a plurality of incoming-side optical fibers 11 through which light is to propagate, the incoming-side optical fibers 11 being two-dimensionally arranged to cause the light to enter the space optical system 30;

a plurality of outgoing-side optical fibers 12 through which light is to propagate, the outgoing-side optical fibers 12 being arranged to receive a most outgoing light 42 from the space optical system 30;

a light-receiving element 5 located to receive a partial outgoing light 43 from the space optical system 30;

an incoming-side lens 21 located between the space optical system 30 and the incoming-side optical fibers 11 and that causes the incoming light into the space optical system 30 to be a parallel light; and an outgoing-side lens 22 located between the space optical system 30 and the outgoing-side optical fibers 12 and that efficiently couples the outgoing light from the space optical system 30 to the outgoing-side optical fibers 12.

FIG. 1 illustrates an example where the specific direction and the first direction are each an x-axis direction, whereas the other specific direction and the second direction are each a z-axis direction; however, these directions can each be any direction depending on the optical design of the optical system 30. In addition, the space optical system 30 can be provided by any optical component having a branch surface capable of branching into two lights different in direction instead of a space system.

In the optical monitor device illustrated by way of example in FIG. 1, light from the incoming-side optical fibers 11 is caused to be a parallel light through the incoming-side lens 21, being prevented from being lost due to diffusion. Further, the space optical system 30 enables the majority of light to be guided to the outgoing-side lens 22. The outgoing-side lens 22 collects the light passing through the space optical system 30 and couples it to the outgoing-side optical fibers 12. Thus, it is possible to guide the majority of light from the incoming-side optical fibers 11 to the outgoing-side optical fibers 12 with less loss.

Meanwhile, the part of light branched through the space optical system 30 is guided to the light-receiving element 5 located in the direction different from that of the majority of light. Thus, it is possible to measure the intensity of the part of light propagating from the incoming-side optical fibers 11 to the outgoing-side optical fibers 12.

Assuming that the intensity of light measured by the light-receiving element 5 is L [mW] with the proviso that the branching ratio of the space optical system 30 is constant and known in advance and is, for example, N:1, it can be known that the intensity of the light entering from the incoming-side optical fibers 11 is $(N+1) \times L$ [mW] and the intensity of the light propagating to the outgoing-side optical fibers 12 is $N \times L$ [mW].

The light-receiving element 5 may be provided by a plurality of light-receiving elements arranged such that they match the two-dimensional arrangement form of the incoming-side optical fibers 11 or may be provided by a single light-receiving element that can detect the intensity of light at each incident position of the incoming light, such as an area imaging sensor. In this case, the intensities of incoming lights detected by the light-receiving element 5 are to be outputted on an incoming-light-by-incoming-light basis. This enables a reduction in the number of components and use with the incoming-side optical fibers 11 in any two-dimensional arrangement.

In the optical monitor device illustrated by way of example in FIG. 1, the incoming-side optical fibers 11 and the outgoing-side optical fibers 12 are two-dimensionally arranged and two-dimensionally arranged light beams are to be branched through the space optical system 30. This is effective in enabling a further size reduction than using a single-core-based optical monitor device or an optical monitor device including one-dimensionally arranged optical fibers. It is also effective in making it easy to lower costs by virtue of the components being reduced in number.

FIG. 1 illustrates an example where the incoming-side optical fibers 11, the outgoing-side optical fibers 12, the incoming-side lens 21, and the outgoing-side lens 22 are two-dimensionally arranged in 3×3; however, any combination of numbers equal to or more than 2×2 is possible. In addition, intervals in the respective two-dimensional arrangements of the incoming-side optical fibers 11 and the outgoing-side optical fibers 12 may be the same or different.

First Embodiment

Figure 2:
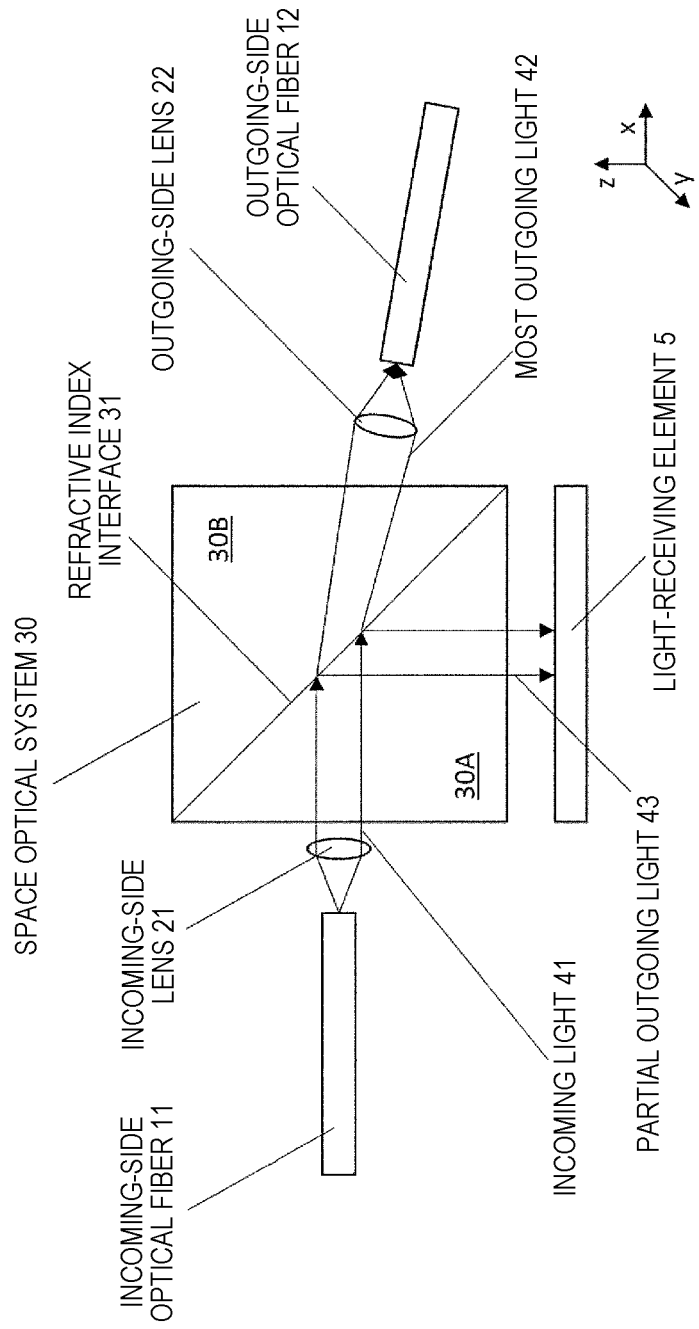
FIG. 2 illustrates an example of a first embodiment.

FIG. 2 illustrates an example of a first embodiment of the present invention. FIG. 2 illustrates only one each of the two-dimensionally arranged incoming-side optical fibers 11 and outgoing-side optical fibers 12 for the convenience of understanding.

In the example of the present embodiment, the space optical system 30 includes two members 30A and 30B different in refractive index on an incoming side and an outgoing side, respectively, and a refractive index interface 31 provided therebetween at a specific angle (in the figure, 45 degrees) relative to an optical axis of the incoming light 41. The members 30A and 30B are bonded to each other with a refractive index matching material having a refractive index close to either the incoming side or the outgoing side. The refractive index matching material may be a curable refractive index matching material having a refractive index close to that of glass, such as an UV resin.

In the example of the present embodiment, the incoming-side member 30A has the larger refractive index and the outgoing-side member 30B has the smaller refractive index, but the members may have the opposite indexes. As long as the angle of incidence of the incoming light 41 relative to the refractive index interface 31 is equal to or less than a critical angle, the majority of the light passes through. At this time, a difference in refraction angle depending on wavelength causes a beam of propagating light to slightly spread as illustrated. The outgoing-side lens 22 may be sized by taking this spread into consideration, which makes it possible to couple the most outgoing light 42 passing through the refractive index interface 31 to the outgoing-side optical fibers 12 without loss. Meanwhile, a part of the incoming light 41 is reflected on the refractive index interface 31 by the Fresnel reflection.

In this example of the embodiment, the partial outgoing light 43, which has been reflected, is received by the light-receiving element 5. The reflectance is constant due to dependency of the Fresnel reflection on the refractive index of a material, so that the branching ratio in the space optical system 30 is constant according to the example of the present embodiment.

Second Embodiment

Figure 3:
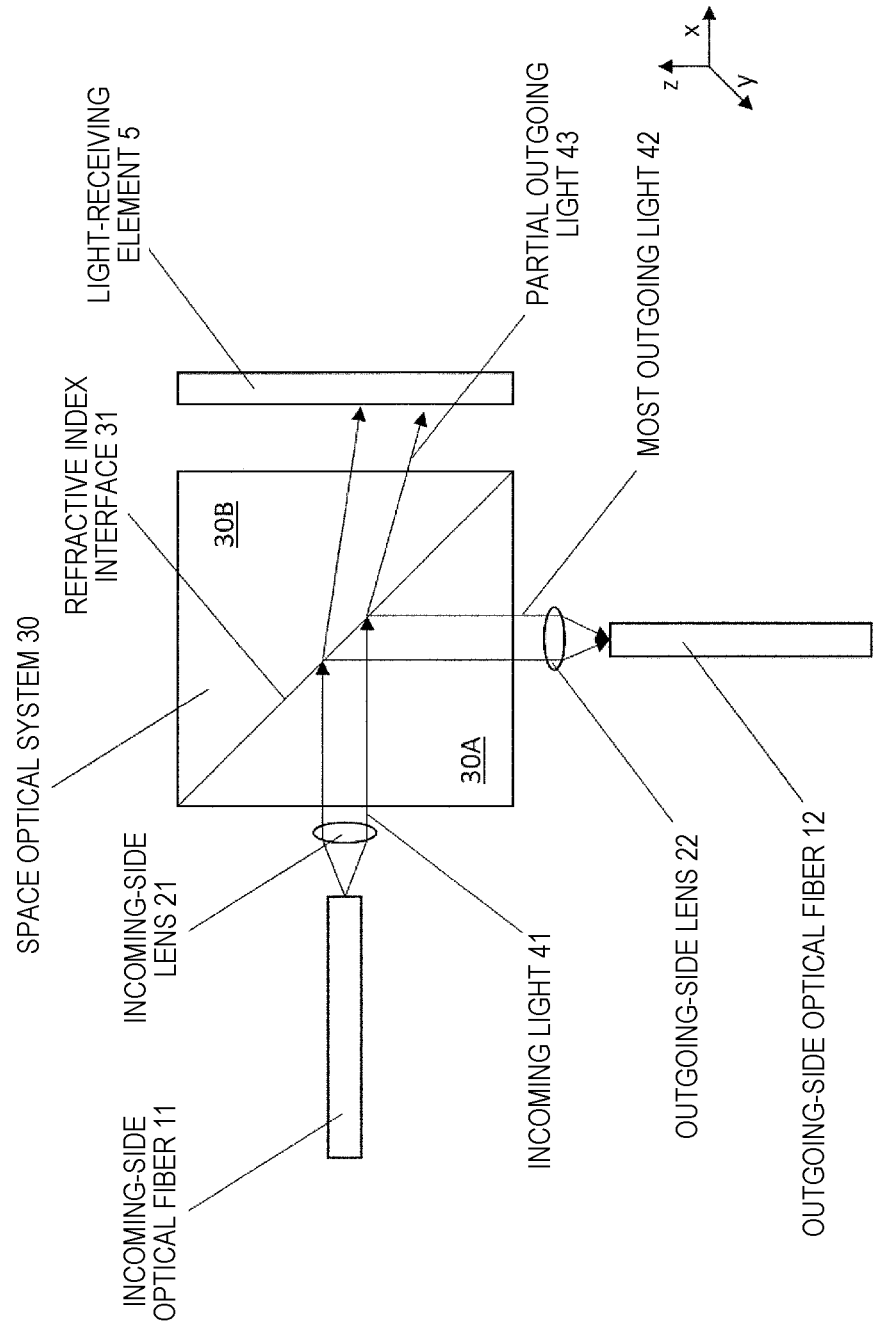
FIG. 3 illustrates an example of a second embodiment.

FIG. 3 illustrates an example of a second embodiment of the present invention. FIG. 3 illustrates only one each of the two-dimensionally arranged incoming-side optical fibers 11 and outgoing-side optical fibers 12 for the convenience of understanding.

In the example of the present embodiment, the space optical system 30 includes two members 30A and 30B different in refractive index on an incoming side and an outgoing side, respectively, and a refractive index interface 31 provided therebetween at a specific angle relative to an optical axis of the incoming light 41.

In the example of the present embodiment, the incoming-side member 30A has the larger refractive index and the outgoing-side member 30B has the smaller refractive index. In a case where the angle of incidence of the incoming light 41 relative to the refractive index interface 31 is extremely close to a critical angle, the majority of the light is reflected. By virtue of the outgoing-side lens 22 and the outgoing-side optical fibers 12 being located on a light-reflection side, the most outgoing light 42, which has been reflected, can be coupled to the outgoing-side optical fibers 12 without loss. Meanwhile, a part of the light passes through.

In this example of the embodiment, the partial outgoing light 43, which has passed through, is received by the light-receiving element 5. The transmittance is constant due to dependency of the transmittance on the refractive index of a material and the angle of incidence, so that the branching ratio in the space optical system 30 is constant according to the example of the present embodiment.

Third Embodiment

Figure 4:
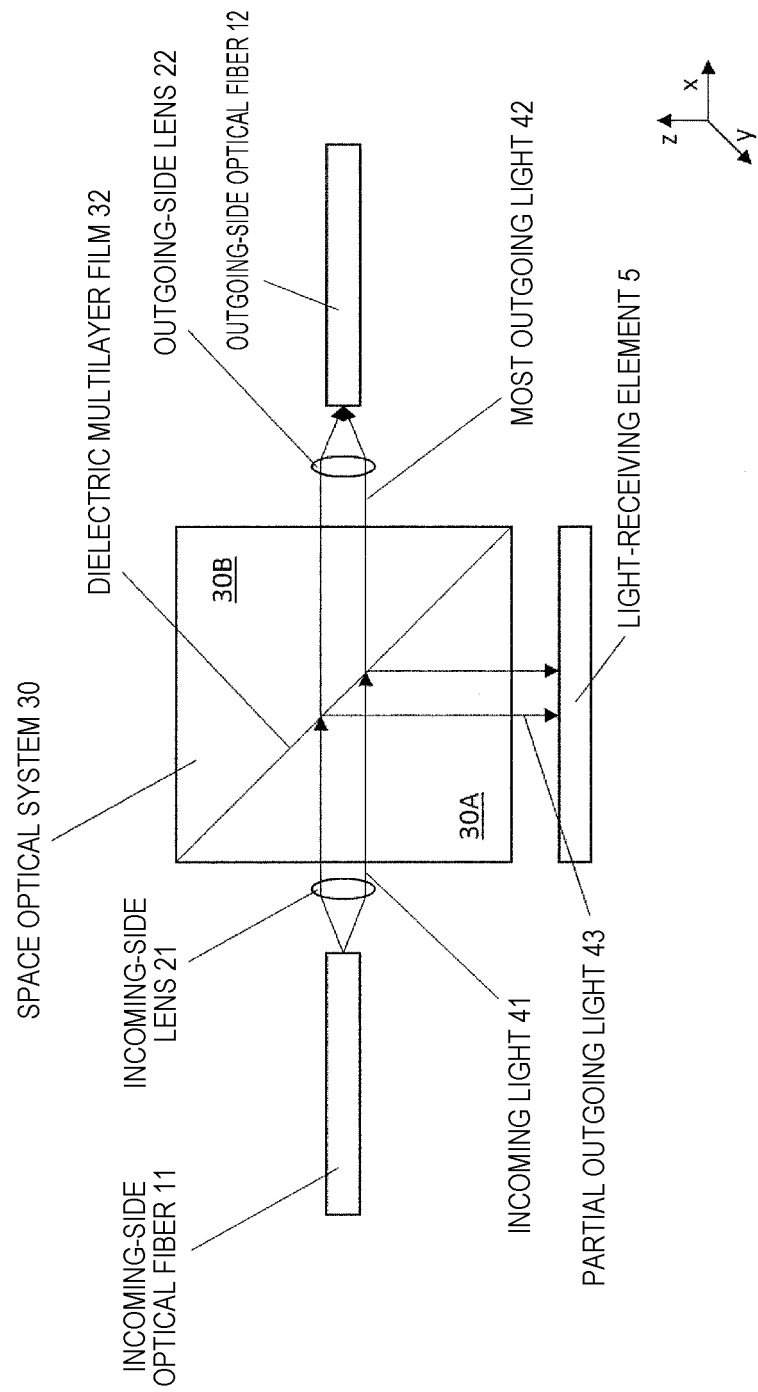
FIG. 4 illustrates an example of a third embodiment.

FIG. 4 illustrates an example of a third embodiment of the present invention. FIG. 4 illustrates only one each of the two-dimensionally arranged incoming-side optical fibers 11 and outgoing-side optical fibers 12 for the convenience of understanding.

In the example of the present embodiment, the space optical system 30 includes materials having the same refractive index on the incoming side and the outgoing side and a dielectric multilayer film 32 provided therebetween, the dielectric multilayer film 32 being provided at a specific angle (in the figure, 45 degrees) relative to an optical axis of the incoming light 41.

In the example of the present embodiment, in a case where the reflectance of the dielectric multilayer film 32 is small, the majority of light passes through. By virtue of the outgoing-side lens 22 and the outgoing-side optical fibers 12 being located on a light-through side of the space optical system 30, the most outgoing light 42, which has passed through, can be coupled to the outgoing-side optical fibers 12 without loss.

In addition, by virtue of the light-receiving element 5 being located on the light-reflection side, the partial outgoing light 43, which has been reflected, can be received. The reflection wavelength and reflectance of a dielectric multilayer film are usually constant. Accordingly, as long as the ratio of light with a reflection wavelength contained in the incoming light 41 is constant, the branching ratio in the space optical system 30 is constant in the example of the present embodiment.

The dielectric multilayer film 32 is provided in a boundary between the members 30A and 30B. It is sufficient that the dielectric multilayer film 32 is provided in a light-through region, of the boundary between the members 30A and 30B, where incoming light is to pass through. In addition, the transmission characteristics and reflection characteristics of the dielectric multilayer film 32 may be the same with respect to any incoming light or may be different depending on the incident position of the incoming light. For example, in a case where the incident position of the incoming light is different depending on each communication band, the transmittance characteristics and reflection characteristics of the dielectric multilayer film 32 may be different for each communication zone.

Fourth Embodiment

Figure 5:
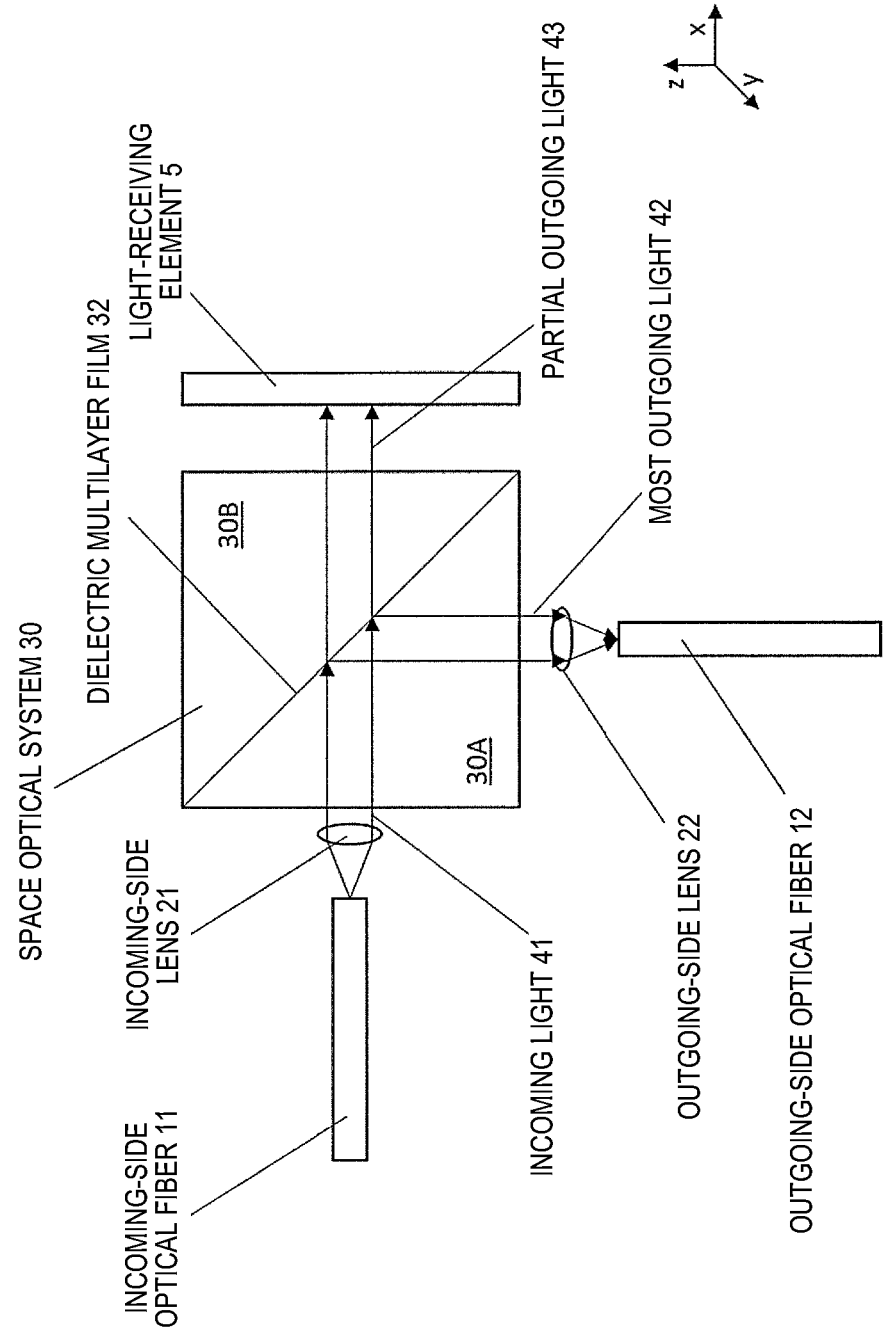
FIG. 5 illustrates an example of a fourth embodiment.

FIG. 5 illustrates an example of a fourth embodiment of the present invention. FIG. 5 illustrates only one each of the two-dimensionally arranged incoming-side optical fibers 11 and outgoing-side optical fibers 12 for the convenience of understanding.

In the example of the present embodiment, the space optical system 30 includes materials having the same refractive index on the incoming side and the outgoing side and a dielectric multilayer film 32 provided therebetween, the dielectric multilayer film 32 being provided at a specific angle (in the figure, 45 degrees) relative to an optical axis of the incoming light 41.

In the example of the present embodiment, in a case where the reflectance of the dielectric multilayer film 32 is large, the majority of light is reflected. By virtue of the outgoing-side lens 22 and the outgoing-side optical fibers 12 being located on the light-reflection side of the space optical system 30, the most outgoing light 42, which has been reflected, can be coupled to the outgoing-side optical fibers 12 without loss.

In addition, by virtue of the light-receiving element 5 being located on the light-through side, the partial outgoing light 43, which has passed through, can be received. The reflection wavelength and reflectance of a dielectric multilayer film are usually constant. Accordingly, as long as the ratio of light with a reflection wavelength contained in the incoming light 41 is constant, the branching ratio in the space optical system 30 is constant in the example of the present embodiment.

The examples of the embodiments are provided above but this is not limiting. For example, the space optical system 30 is not necessarily in a cubic form but may in any form such as a rectangular parallelepiped. In addition, regarding the location of the light-receiving element 5, it may be located at any position where the light branched through the space optical system 30 is receivable. For example, the light-receiving element 5 may be embedded inside the space optical system 30.

The optical monitor device of the present disclosure is also usable for monitoring any light transmitted by an optical transmission system. For example, any apparatus included in an optical transmission system, such as a sender, a receiver, or a relay, may be equipped with the optical monitor device of the present disclosure so that a result of measurement by the light-receiving element 5 can be used for feedback or feedforward to any component inside or outside the apparatus. In addition, the optical monitor device of the present disclosure may be inserted in the middle of a transmission path in an optical transmission system so that the intensity or propagation loss of an optical signal in the transmission path can be measured.

INDUSTRIAL APPLICABILITY

The present disclosure is applicable to information communication industries.

REFERENCE SIGNS LIST

5 Light-receiving element
11 Incoming-side optical fiber
12 Outgoing-side optical fiber
21 Incoming-side lens
22 Outgoing-side lens
31 Refractive index interface
32 Dielectric multilayer film
41 Incoming light
42 Most outgoing light
43 Partial outgoing light
30 Space optical system
30A, 30B Member

The invention claimed is:

1. An optical monitor device comprising:
an optical component configured to branch an incoming light at a branching ratio and output a part of the incoming light in a first direction that is parallel to an axis of the incoming light and a rest of the incoming light in a second direction that is at a first angle relative to the axis of the incoming light;
a plurality of incoming-side optical fibers that are two-dimensionally arranged to cause light to enter the optical component;
a plurality of outgoing-side optical fibers that are two-dimensionally arranged to receive respective outgoing lights in the first direction from the optical component;
a light-receiving element located to receive outgoing lights in the second direction from the optical component;
an incoming-side lens located between the optical component and the incoming-side optical fibers and configured to cause incoming lights into the optical component to be parallel lights; and
an outgoing-side lens located between the optical component and the outgoing-side optical fibers and configured to couple the outgoing lights from the optical component to the outgoing-side optical fibers,
wherein the incoming-side lens is directly coupled to the optical component and the incoming-side optical fibers, and
wherein the outgoing-side lens is directly coupled to the optical component and the outgoing-side optical fibers.

2. The optical monitor device according to claim 1, wherein
the optical component has a refractive index interface provided at a specific angle relative to an optical axis of an incoming light, the refractive index interface having different incoming-side refractive index and outgoing-side refractive index,
the first direction is a direction to pass through the refractive index interface, and
the second direction is a direction to be reflected on the refractive index interface.

3. The optical monitor device according to claim 1, wherein
the optical component comprises a dielectric multilayer film provided at a specific angle relative to an optical axis of an incoming light,
the first direction is a direction to pass through the dielectric multilayer film, and
the second direction is a direction to be reflected on the dielectric multilayer film.

4. The optical monitor device according to claim 2, wherein the refractive index interface is a UV resin.

5. The optical monitor device according to claim 3, wherein the dielectric multilayer film is positioned at a 45 degree angle relative to the axis of incoming light.

6. The optical monitor device according to claim 1, wherein the plurality of incoming-side optical fibers are positioned proximate to a first side of the optical component and the plurality of outgoing-side optical fibers being positioned proximate to a second side of the optical component opposite the first side.

7. The optical monitor device according to claim 6, wherein the light-receiving element is positioned proximate to a third side of the optical component between the first side and the second side.

8. The optical monitor device according to claim 1, wherein the light-receiving element includes a plurality of light-receiving elements.

9. The optical monitor device according to claim 1, wherein
an intensity of light measured by the light-receiving element is L (mW);
the branching ratio is N:1;
an intensity of the incoming light is (N+1)×L (mW); and
an intensity of the outgoing lights is N×L (mW).

10. An optical monitor device comprising:
an optical component including a branch surface configured to branch an incoming light entering through a predetermined incident region into two at a branching ratio into a branched light and an outgoing light, the branched light being branched at a smaller portion of the branching ratio;

a light-receiving element configured to receive, the branched light and detect an intensity of the branched light within the incident region;

an incoming-side lens directly coupled to a plurality of incoming fibers and the optical component, the incoming fibers arranged to cause the incoming light to enter the optical component; and an outgoing-side lens directly coupled to a plurality of outgoing fibers and the optical component, the outgoing-side lens arranged to receive the outgoing light.

11. The optical monitor device according to claim 10, wherein the branch surface comprises a refractive index interface provided at a specific angle relative to an axis of the incoming light, the refractive index interface has an incoming-side refractive index lower than an outgoing-side refractive index, the branched light is reflected on the refractive index interface, and the outgoing light passes through the refractive index interface.

12. The optical monitor device according to claim 10, wherein the branch surface comprises a dielectric multilayer film provided at a specific angle relative to an axis of the incoming light, the branched light is reflected on the dielectric multilayer film, and the outgoing light passes through the dielectric multilayer film.

13. An optical monitor device comprising:

an optical component configured to branch an incoming light at a branching ratio and output a part of the incoming light in a first direction that is at a first angle relative to an axis of the incoming light and a rest of the incoming light in a second direction that is parallel to the axis of the incoming light;

a plurality of incoming-side optical fibers that are two-dimensionally arranged to cause light to enter the optical component;

a plurality of outgoing-side optical fibers that are two-dimensionally arranged to receive respective outgoing lights in the first direction from the optical component;

a light-receiving element located to receive outgoing lights in the second direction from the optical component;

an incoming-side lens located between the optical component and the incoming-side optical fibers and configured to cause incoming lights into the optical component to be parallel lights; and an outgoing-side lens located between the optical component and the outgoing-side optical fibers and configured to couple the outgoing lights from the optical component to the outgoing-side optical fibers, wherein the incoming-side lens is directly coupled to the optical component and the incoming-side optical fibers, and wherein the outgoing-side lens is directly coupled to the optical component and the outgoing-side optical fibers.

14. The optical monitor device according to claim 13, wherein the plurality of incoming-side optical fibers is positioned proximate to a first side of the optical component, and wherein the light-receiving element is positioned proximate to a second side of the optical component opposite the first side.

15. The optical monitor device according to claim 14, wherein the plurality of outgoing-side optical fibers is positioned proximate to a third side of the optical component between the first side and the second side.

16. The optical monitor device according to claim 13, wherein the optical component has a refractive index interface provided at a specific angle relative to an optical axis of an incoming light, the refractive index interface having an incoming-side refractive index lower than an outgoing-side refractive index, the first direction is a direction to be reflected on the refractive index interface, and the second direction is a direction to pass through the refractive index interface.

17. The optical monitor device according to claim 16, wherein the refractive index interface is a UV resin.

18. The optical monitor device according to claim 13, wherein the optical component comprises a dielectric multilayer film provided at a specific angle relative to an optical axis of an incoming light, the first direction is a direction to be reflected on the dielectric multilayer film, and the second direction is a direction to pass through the dielectric multilayer film.

19. The optical monitor device according to claim 18, wherein the dielectric multilayer film is positioned at a 45 degree angle relative to the axis of incoming light.

* * * * *